US006380544B1

(12) United States Patent
Broerman

(10) Patent No.: US 6,380,544 B1
(45) Date of Patent: Apr. 30, 2002

(54) GERMANIUM GAMMA-RAY DETECTOR

(75) Inventor: Eric C. Broerman, Knoxville, TN (US)

(73) Assignee: PerkinElmer, Inc., Oak Ridge, TN (US)

( * ) Notice: Subject to any disclaimer, the term of this patent is extended or adjusted under 35 U.S.C. 154(b) by 0 days.

(21) Appl. No.: 09/532,359

(22) Filed: Mar. 21, 2000

(51) Int. Cl.[7] .............................. G01T 1/24; F25J 1/00

(52) U.S. Cl. ........................... 250/370.15; 250/370.12; 62/613

(58) Field of Search ....................... 250/370.15, 370.12, 250/370.01, 352; 62/613, 114, 48.2

(56) References Cited

U.S. PATENT DOCUMENTS 4,851,684 A * 7/1989 Martin et al. ............... 250/352
5,724,832 A * 3/1998 Little et al. ................... 62/613

* cited by examiner

*Primary Examiner*—Hung Xuan Dang
(74) *Attorney, Agent, or Firm*—Pitts & Brittian, P.C.

(57) ABSTRACT

A germanium gamma-ray detector contained in a vacuum insulated cryostat is provided. The present invention provides a low-cost, high-performance, and highly reliable cooling system for germanium detectors. Moreover, the present invention provides a germanium detector operating environment that meets all the requirements for optimum performance of such detectors incorporating said cooling system. A self-cleaning cooler includes a counter-current heat exchanger which is received within a cooler housing. A removable cryostat is provided for being carried by the cooler housing. A capsule cold finger provides the cooling path to germanium detector element. A centering spacer/isolator is provided for maintaining the position and supporting the weight of the detector in an end cap without conducting an excessive amount of heat into the detector. A capsule flange is provided to substantially close the volume within the end cap. The heat exchanger and the throttle capillary of the cooler cool the cold block. A thermal link is thermally connected to a cooler cold finger. A threaded bayonet mates with the detachable cryostat and completes an insulating vacuum space for the cooler section. The cold block incorporates a heater and temperature sensor to accurately control the temperature. of the germanium detector. An external temperature controller is provided for monitoring the temperature sensor and modulating the heat input into the heater to maintain the proper temperature for optimum performance of the germanium detector.

8 Claims, 5 Drawing Sheets

GERMANIUM GAMMA-RAY DETECTOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to an improved cooling system for germanium radiation detectors. More specifically, the present invention combines the use of an innovative new electromechanical cryogenic cooler with novel cryogenics to produce a low-cost, extremely reliable germanium gamma-ray system.

2. Description of the Related Art

Gamma-ray detectors in the form of large germanium diodes have been the preferred detectors for use in high resolution gamma-ray spectroscopy for many years. Germanium gamma-ray detectors are very accurate, having the capability of measuring the energy of a 1 MeV gamma-ray to better than 0.1 percent accuracy. However, the signal produced by these detectors is very small. For example, it is known that a 1 MeV gamma-ray produces a charge signal of only 5.4 femtoCoulombs of charge. Integrated on a typical detector capacitance of 20 picoFarads the resulting voltage signal is 3 mV. In order to preserve the intrinsic accuracy of the detector, all noise sources must be in the microvolt range. Achieving such a low noise requires a highly controlled environment for the detector.

At room temperature the dark current in a germanium diode produces noise far larger than the signal itself. When the operating temperature of the detector is lowered to cryogenic temperatures, typically about 100 Kelvin, the dark current is reduced to an insignificant level. Because the germanium detector signal itself is highly temperature dependent, the temperature must be held very stable. A temperature change of only 1 degree will cause an error of 0.2 keV in the 1 MeV gamma ray measurement.

Since the germanium detector is reverse biased to several thousand volts in operation, it is necessary that the detector surfaces be kept in a highly insulating state. This normally requires a very clean vacuum environment, free of condensable gases that could cause noisy leakage currents in the detector.

The combination of high reverse bias voltages and very small signals results in a sensitivity to microphonically generated noise. The environment must thus be free of vibrations at frequencies in the pass band of the spectroscopy amplifier system.

It is well known to use liquid nitrogen (LN) cooling for achieving this highly controlled environment. The temperature of LN at atmospheric pressure is about 77° K. and is quite stable. U.S. Pat. No. 4,851,684 issued to G. N. Martin et al., fully incorporated herein by reference, discloses a photon detector system including a vacuum-jacketed radiation detector in a cryostat assembly. In the ’684 patent, a cryogenic gamma radiation detector cooled by a dewar is specifically disclosed. A germanium detector is enclosed in a vacuum insulated cryostat in thermal communication with a reservoir of LN. Martin et al. disclose a particular form of such a cryostat offering the additional advantage of allowing the cryostat to be conveniently separated from the source of cooling.

LN based cooling systems are relatively inexpensive and reliable. They do, however, require periodic refilling of the LN, which may present problems in remote installations or hazardous environments. The filling itself can be a safety hazard and requires a trained operator. Alternative methods of cooling have been available for many years but have not been widely used because of a number of problems. Mechanical coolers based on the Stirling cycle have been used in military and space systems but have a prohibitively high cost and must be periodically maintained, requiring the germanium detector to be removed from service. Recently, a class of mechanical coolers based on principles similar to the air conditioner has been developed. These coolers use a mixed-refrigerant throttle cycle (MRTC) to produce cooling. Germanium spectroscopy systems using these systems are now commercially available but are still much more expensive and less reliable than LN based systems.

U.S. Pat. Nos. 5,617,739 issued to Little and 5,724,832 issued to Little et al., both fully incorporated herein by reference, disclose a unique version of the MRTC cooler including a novel self-cleaning feature to allow the use of an inexpensive mass-produced air conditioning compressor in the system. The oil clogging which would be expected to result at cryogenic temperatures is prevented by the self-cleaning feature. The result is an inexpensive, highly reliable cooler.

However, the above references fail to disclose a highly reliable cooling system for germanium detectors in order to overcome the sensitivity of the detector to microphonically generated noise as a result of high reverse bias voltages and very small detector signals.

Accordingly, it is an object of this invention to provide a low-cost, high-performance, and highly reliable cooling system for germanium detectors.

It is a further object of the present invention to provide a germanium detector operating environment that meets all the requirements for optimum performance of such detectors incorporating said cooling system.

BRIEF SUMMARY OF THE INVENTION

A germanium gamma-ray detector contained in a vacuum insulated cryostat is provided. The present invention provides a low-cost, high-performance, and highly reliable cooling system for germanium detectors. Moreover, the present invention provides a germanium detector operating environment that meets all the requirements for optimum performance of such detectors incorporating said cooling system.

A self-cleaning MRTC cooler is incorporated in the present invention. The MRTC cooler includes a counter-current heat exchanger which is received within a cooler housing.

A removable cryostat is provided for being carried by the cooler housing. A connector tip is machined to a precise diameter to mate with the cooler. A capsule cold finger provides the cooling path to germanium detector element. A centering spacer/isolator is provided for maintaining the position and supporting the weight of the detector in an end cap without conducting an excessive amount of heat into the detector. A capsule flange is provided to substantially close the volume within the end cap. A thin vacuum wall is disposed between the capsule flange and the connector tip in order to accomplish a vacuum within the end cap when attached to a cooler.

The heat exchanger and the throttle capillary of the cooler cool the cold block. A thermal link is thermally connected to a cooler cold finger, which has an internal diameter precisely matched to the diameter of the capsule cold finger. The cooler cold finger is connected to the warm outer wall by a vacuum isolator. At room temperature, the cooler cold finger and the detector capsule connector tip are configured to accomplish a close fit. However, at cryogenic temperatures, the fit is extremely tight and provides a high thermal conductivity joint. A gas adsorber, typically a molecular sieve, is received within the cooler cold finger. A threaded bayonet mates with the detachable cryostat and completes an insulating vacuum space for the cooler section.

The cold block incorporates a heater and temperature sensor to accurately control the temperature of the germanium detector. An external temperature controller is provided for monitoring the temperature sensor and modulating the heat input into the heater to maintain the proper temperature for optimum performance of the germanium detector. The cold block also provides a container for cooling a gas adsorber, typically a molecular sieve, for maintaining the required vacuum level. The adsorber provides the insulating vacuum only in the cooler section.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A germanium gamma-ray detector system incorporating various features of the present invention are illustrated generally at 10 in the figures. The germanium gamma-ray detector system 10, provides a low-cost, high-performance, and highly reliable cooling system for germanium detectors. Moreover, the germanium gamma-ray detector system 10 provides a germanium detector operating environment that meets all the requirements for optimum performance of such detectors incorporating said cooling system.

Figure 1:
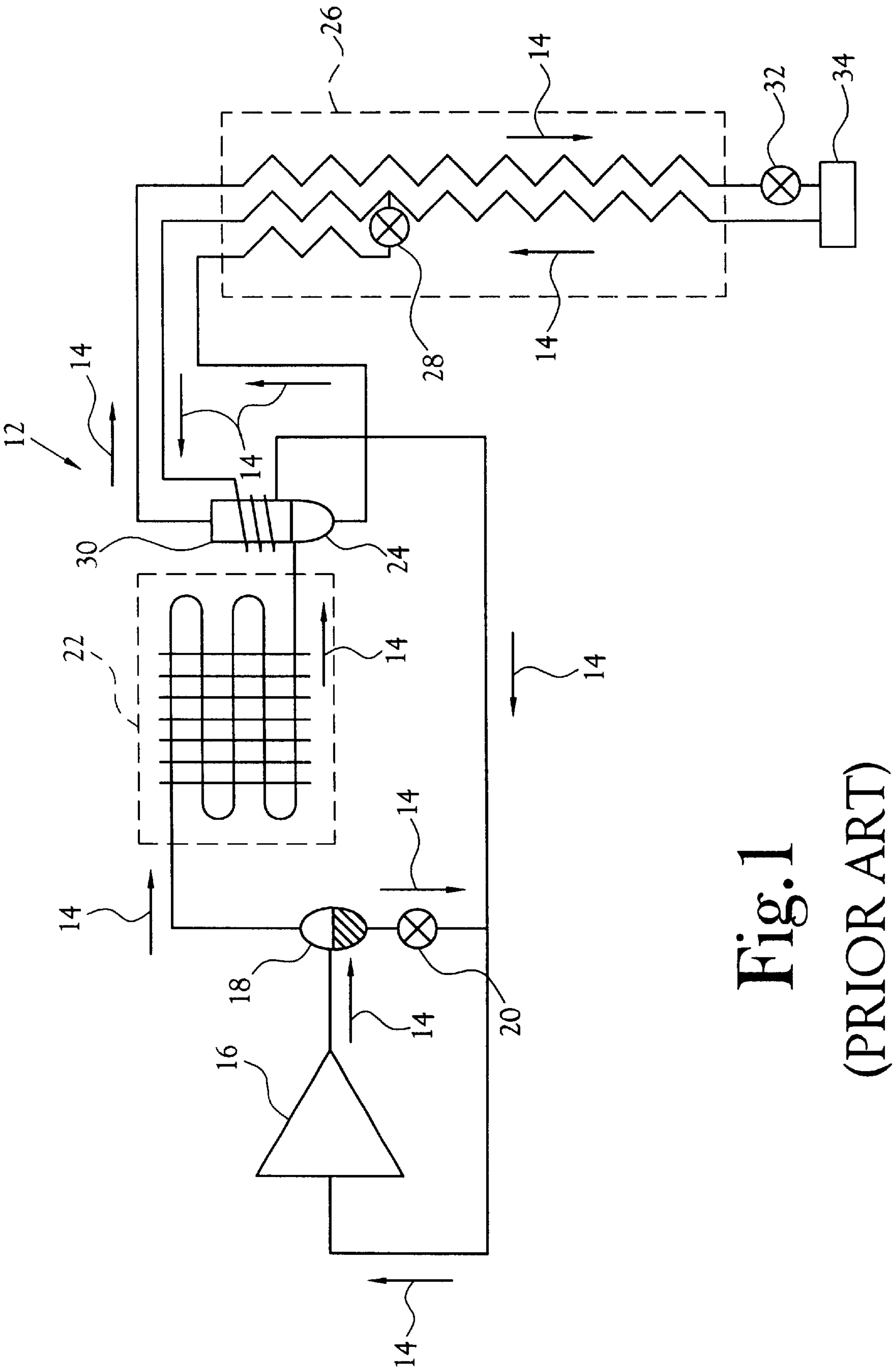
Fig. 1 (PRIOR ART)
FIG. 1 is a schematic illustration of a self-cleaning MRTC cooler of the prior art.

FIG. 1 illustrates a self-cleaning MRTC cooler 12 incorporated in the present invention. A refrigerant is circulated through the cooler 12 in the direction of the arrows 14. A compressor 16 compresses a low-pressure returning stream of the refrigerant. The refrigerant exits the compressor 16 as a hot vapor and is introduced into a cyclone oil separator 18. Oil extracted from the refrigerant is delivered back to the compressor 16 via a capillary 20. The substantially oil-free refrigerant, still in the form of a hot vapor, is then delivered to an air-cooled condenser 22 wherein at least a portion of the refrigerant is liquified. The liquid and vapor portions of the refrigerant are then separated in a cyclone liquid-vapor separator 24.

The liquid portion of the refrigerant is evacuated from the lower portion of the separator 24 and is introduced through the top of a counter-current heat exchanger 26 where it is pre-cooled by a stream of cold vapor returning from the low-temperature portion of the cooler 12. The pre-cooled liquid then passes through an expansion capillary 28, causing it to evaporate and cool further. The evaporated refrigerant then joins the returning cold vapor stream in the heat exchanger 26.

After the refrigerant exits the heat exchanger 26, it flows through a tube coiled around a fractioning column 30 and then returns to the low pressure side of the compressor 16.

The vapor portion of the refrigerant in the liquid-vapor separator 24 is delivered through the inside of the fractioning column 30 and flows into the heat exchanger 26 where it progressively cools and condenses. The high-pressure liquid expands through a capillary 32, cooling further as it evaporates. The resulting cold vapor stream absorbs heat from a cold plate 34 which is used to cool a load inside a thermally insulated container.

Figure 2:
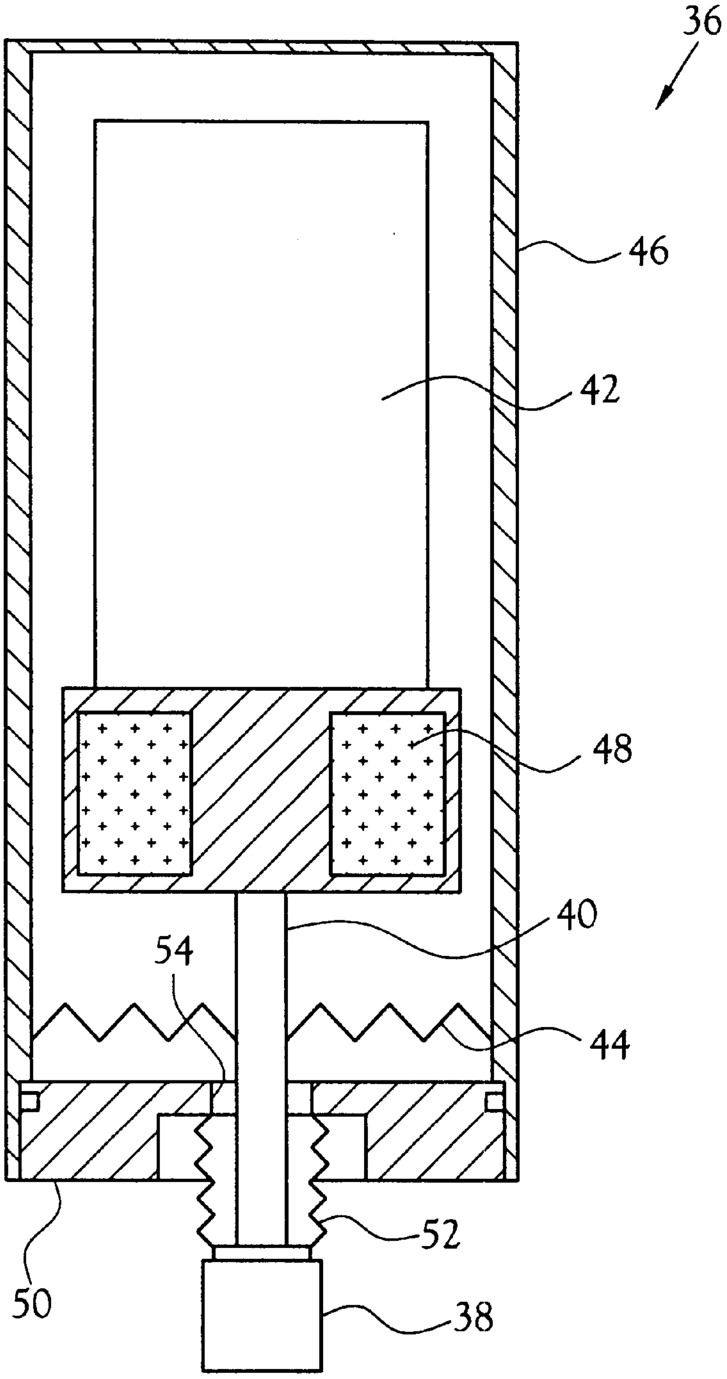
Fig.2 (PRIOR ART)
FIG. 2 is a schematic illustration of a removable cryostat, or detector capsule, of the prior art.

FIG. 2 illustrates a removable cryostat 36, or detector capsule 36. A connector tip 38 is machined to a precise diameter to mate with the cooler 12. A capsule cold finger 40 provides the cooling path to germanium detector element 42. In the preferred embodiment, the capsule cold finger 40 retains and cools a molecular sieve 48. A centering spacer/isolator 44 is provided for maintaining the position and supporting the weight of the detector 42 in an end cap 46 without conducting an excessive amount of heat into the detector 42. In the preferred embodiment, the end cap 46 is removable to allow assembly, repair and replacement of the detector 42. A capsule flange 50 is provided to substantially close the volume within the end cap 46, the flange 50 defining a centrally disposed opening 54 for receiving the capsule cold finger 40. A thin vacuum wall 52 is disposed between the capsule flange 50 and the connector tip 38 in order to accomplish a vacuum within the end cap 46.

Figure 3:
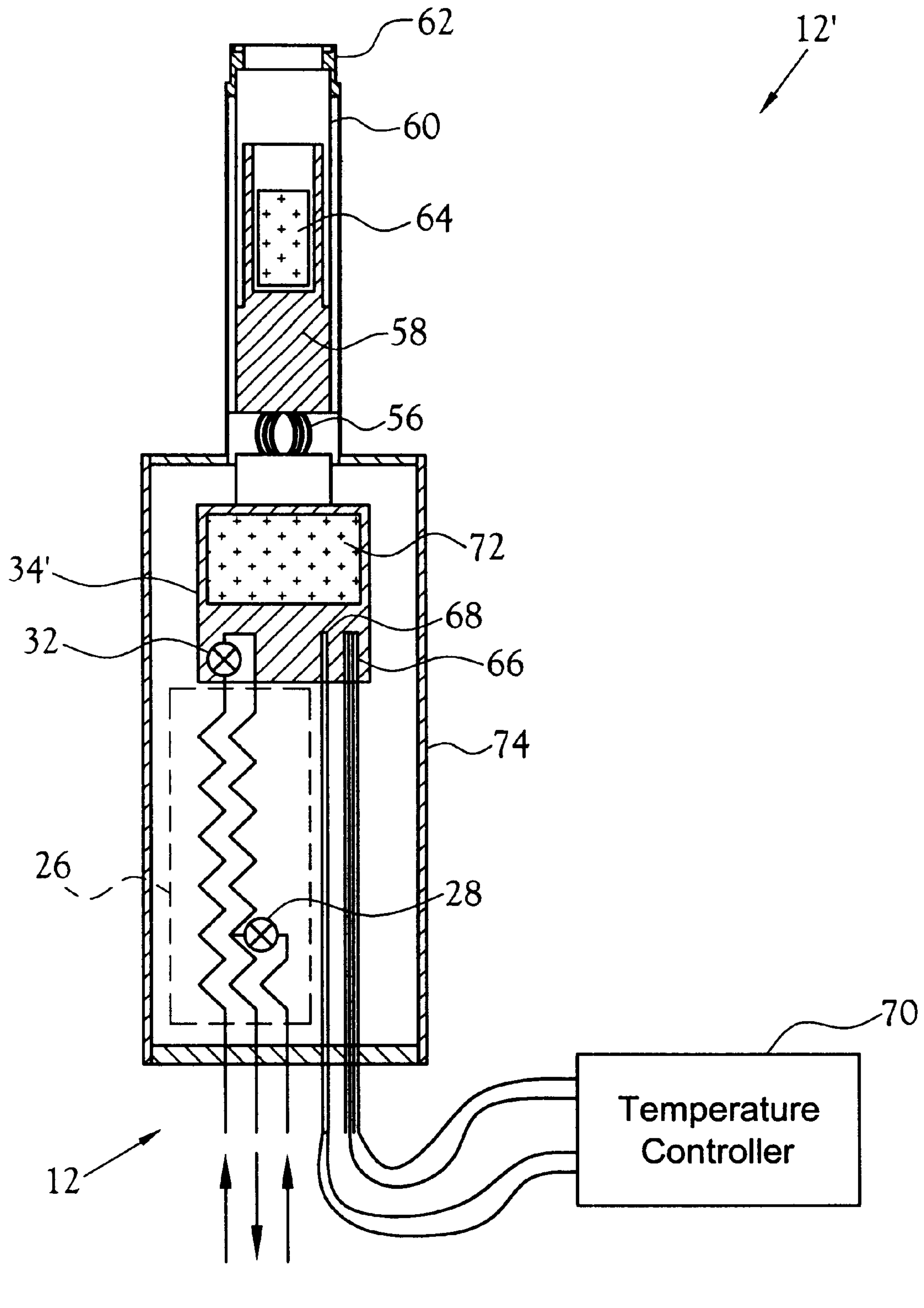
FIG. 3 is a schematic illustration of the electromechanical cryogenic cooler of the present invention showing a removable cryostat, or detector capsule, having been removed.

FIG. 3 shows the self-cleaning cooler 12 modified to allow the connection of a detector capsule 36 such as that illustrated in FIG. 2. The heat exchanger 26 and the throttle capillary 32 cool the cold block 34'. A thermal link 56 is thermally connected to a cooler cold finger 58. The cooler cold finger 58 has an internal diameter precisely matched to the diameter of the capsule connector tip 38. The cooler cold finger 58 is connected to the warm outer wall by a vacuum isolator 60 made from a material with good mechanical properties but low thermal conductivity, such as fiberglass. In the preferred embodiment, the cooler cold finger 58 is fabricated from a material defining a higher thermal expansion coefficient than the detector capsule connector tip 38. At room temperature, the cooler cold finger 58 and the detector capsule connector tip 38 are configured to accomplish a close fit. However, at cryogenic temperatures, the fit is extremely tight and provides a high thermal conductivity joint. A molecular sieve 64 is received within the cooler cold finger 58. A threaded bayonet 62 mates with the detachable cryostat 36 and completes an insulating vacuum space for the cooler section.

The cold block 34' incorporates a heater 66 and temperature sensor 68 to accurately control the temperature of the germanium detector 42. An external temperature controller 70 is provided for monitoring the temperature sensor 68 and modulating the heat input into the heater 66 to maintain the proper temperature for optimum performance of the germanium detector 42. The cold block 34' also provides a container for cooling an adsorber 72 for maintaining the required vacuum level. The adsorber 72 provides the insulating vacuum only in the cooler section.

Figure 4:
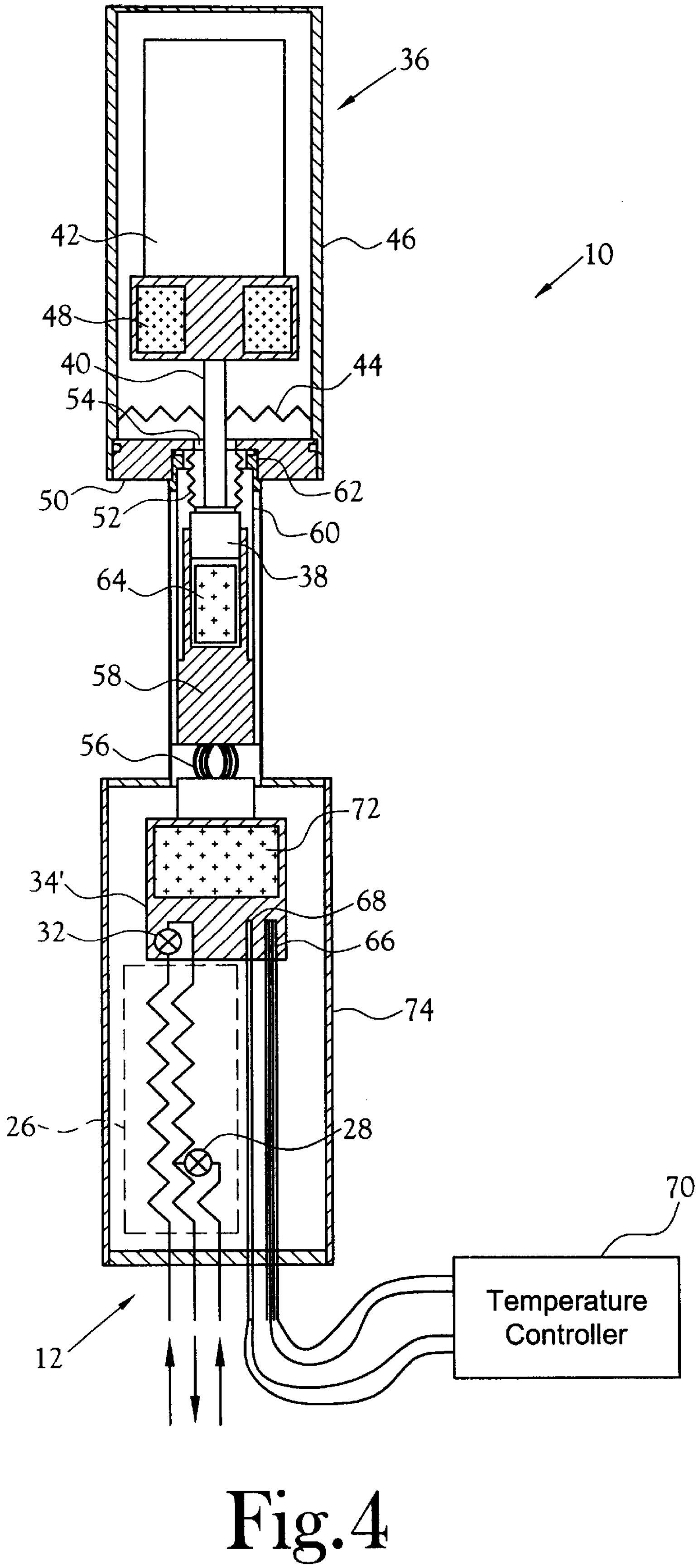
FIG. 4 illustrates electromechanical cryogenic cooler of FIG. 3 shows a detector capsule attached thereto.

FIG. 4 illustrates the cooler 12' of FIG. 3 and the detector capsule 36 of FIG. 2 secured one to the other. A vacuum is created within the vacuum isolator 60 in the region surrounding the connector tip 38. This vacuum is created by the molecular sieve 64 and is sealed at the threaded bayonet 62.

Figure 5:
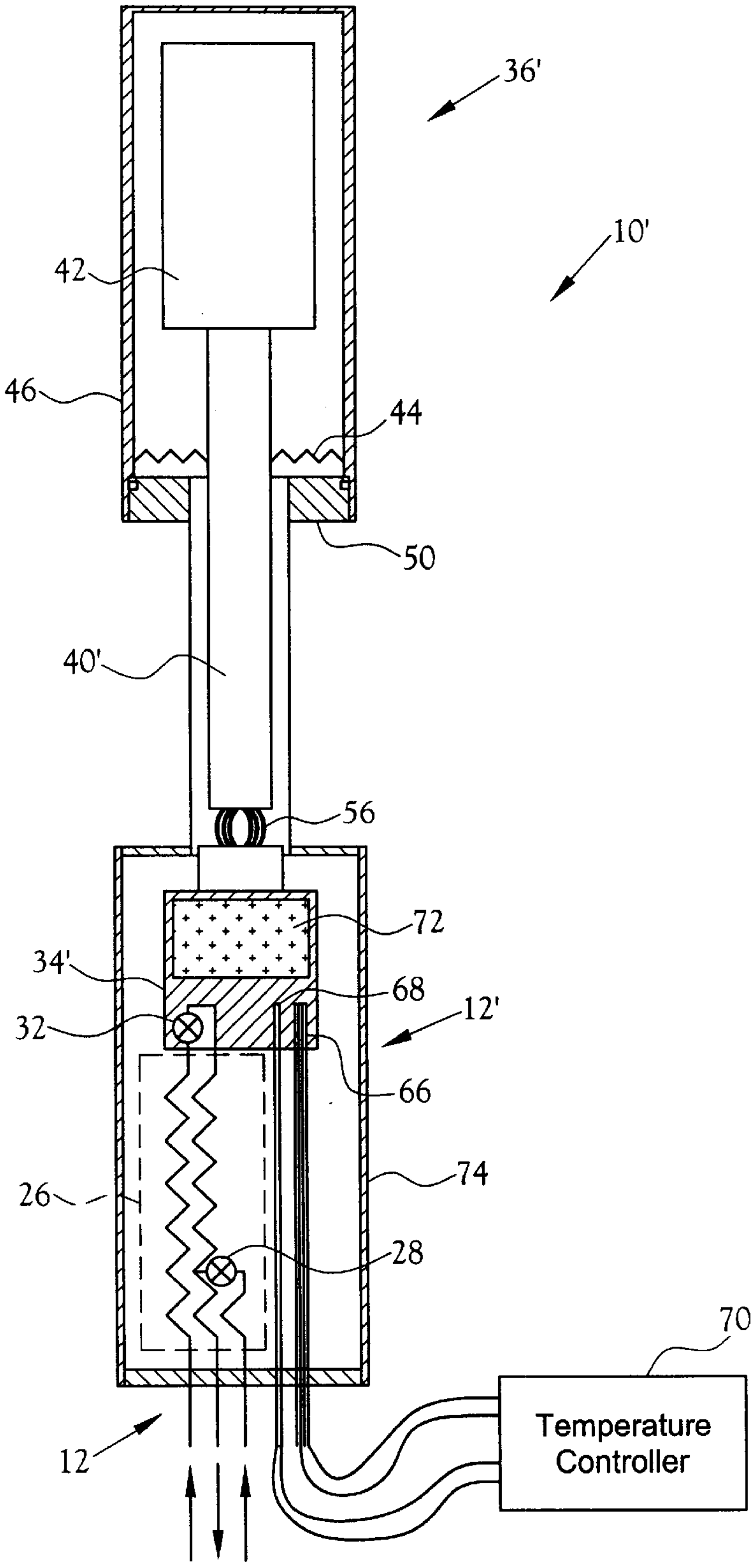
FIG. 5 is a schematic illustration of the electromechanical cryogenic cooler of the present invention showing a cooler, a thermal connection and a permanently affixed cryostat and germanium detector.

FIG. 5 illustrates an alternate embodiment of the germanium gamma-ray detector 10' of the present invention wherein the cryostat 36' is permanently fixed to the cooler 12'. The cooler 12' provides the optimum operating environment for a germanium radiation detector 42. The heat exchanger 26 and throttle capillary 32 cool the cold block 34'. The cold block 34' is in thermal connection with thermal link 56 which defines high thermal conductivity but low mechanical stiffness thus providing a thermal connection to a cold finger 40' while also isolating cold finger 40' from vibrations generated in the cold block 34' by the flow of liquids and gases in heat exchanger 26. The cold finger 40' provides the cooling path to the germanium detector element 42. The thermal link 56 of one embodiment is formed from many strands of fine copper wire.

From the foregoing description, it will be recognized by those skilled in the art that a germanium gamma-ray detector system has been disclosed that provides a low-cost, high-performance, and highly reliable cooling system for germanium detectors. Moreover, the germanium gamma-ray detector provides a germanium detector operating environment that meets all the requirements for optimum performance of such detectors incorporating said cooling system.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. A germanium gamma-ray detector system comprising:

a self-cleaning mixed-refrigerant throttle cycle cooler for circulating a refrigerant through a cooling circuit, said cooler including in said cooling circuit:

- a compressor for compressing said refrigerant;
- an oil separator for extracting oil from said refrigerant;
- an air-cooled condenser for liquefying at least a portion of said refrigerant;
- a liquid-vapor separator for separating a liquid portion and a vapor portion of said refrigerant;
- a counter-current heat exchanger for pre-cooling said vapor portion of said refrigerant and for circulating said vapor portion of said refrigerant for heat removal; and
- a vacuum wall defining a volume in which is received said heat exchanger;

a detector capsule defining a thermally insulated volume; and a germanium detector disposed within said detector capsule and in thermal communication with said cooler heat exchanger, said vapor portion of said refrigerant absorbing heat from said germanium detector.

2. The germanium gamma-ray detector of claim 1 further comprising a vacuum isolator disposed between said germanium detector and said cooler heat exchanger, a thermal connector disposed at least partially within said vacuum isolator for accomplishing heat absorption by said vapor portion of said refrigerant, and a thermal connector gas adsorber for creating a vacuum within said vacuum isolator.

3. The germanium gamma-ray detector of claim 2 wherein said thermal connector includes a cooler cold finger in thermal communication with said heat exchanger, a detector cold finger in thermal communication with said germanium detector, and a thermal link in thermal communication between said cooler cold finger and said detector cold finger.

4. The germanium gamma-ray detector of claim 3 further comprising a heater disposed in thermal communication with said cooler cold finger, a temperature sensor disposed in thermal communication with said cooler cold finger, and an external temperature controller in electrical communication with said heater and said temperature sensor for monitoring said temperature sensor and modulating heat input into said heater to maintain a temperature for optimum performance of said germanium detector.

5. The germanium gamma-ray detector of claim 2 further comprising a molecular sieve disposed between said germanium detector and said thermal connector.

6. The germanium gamma-ray detector of claim 1 further comprising a centering spacer disposed within said detector housing and about said germanium detector for supporting and stabilizing said germanium detector within said detector housing.

7. The germanium gamma-ray detector of claim 1 wherein said detector housing is removable for assembly, repair and replacement of said germanium detector.

8. The germanium gamma-ray detector of claim 1 wherein said detector capsule is permanently affixed to said cooler.

* * * * *